April 13, 1926. 1,581,051
P. GARDNER
BIAS CUTTING MACHINE
Filed Oct. 9, 1924 4 Sheets-Sheet 1
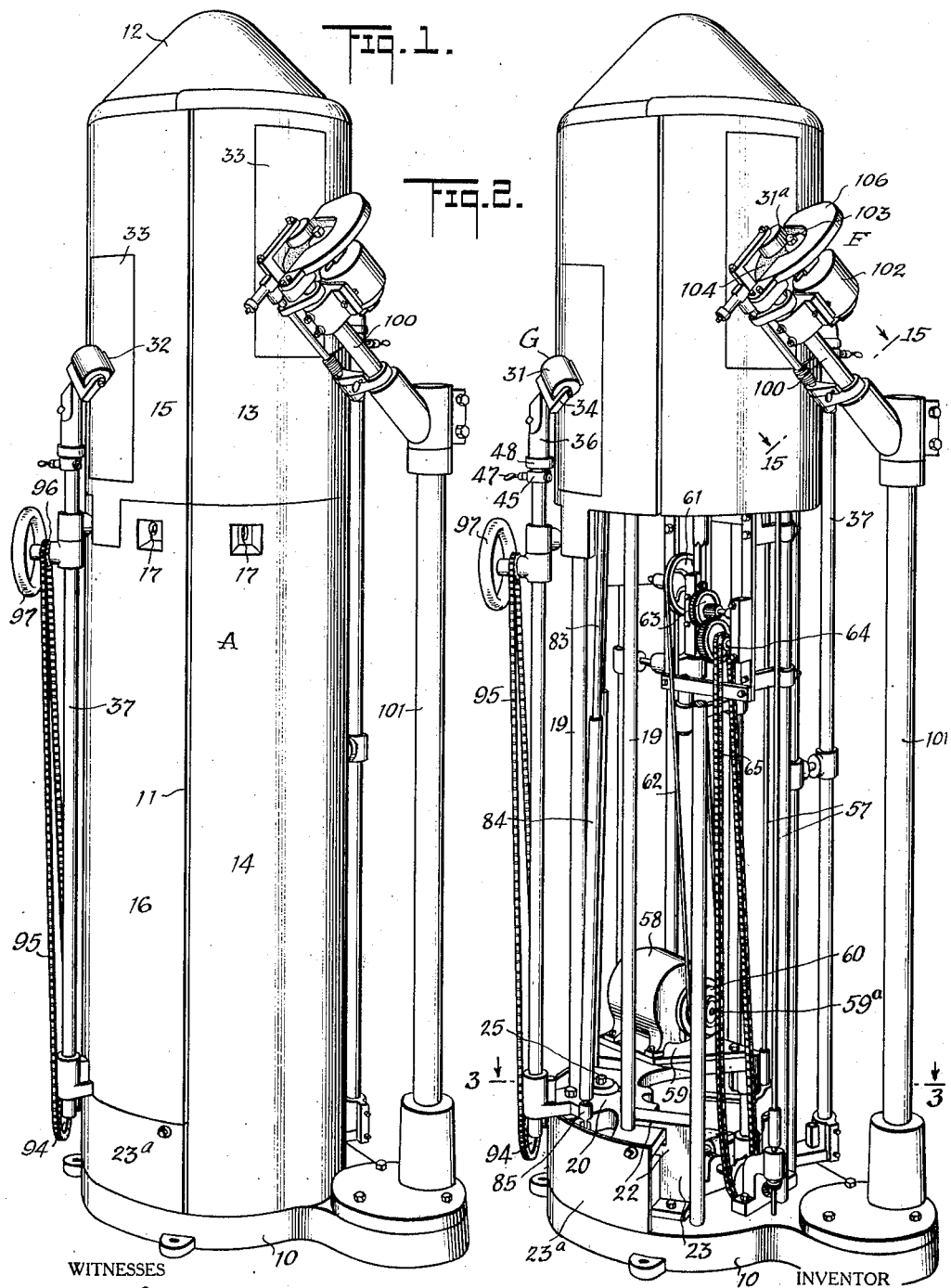

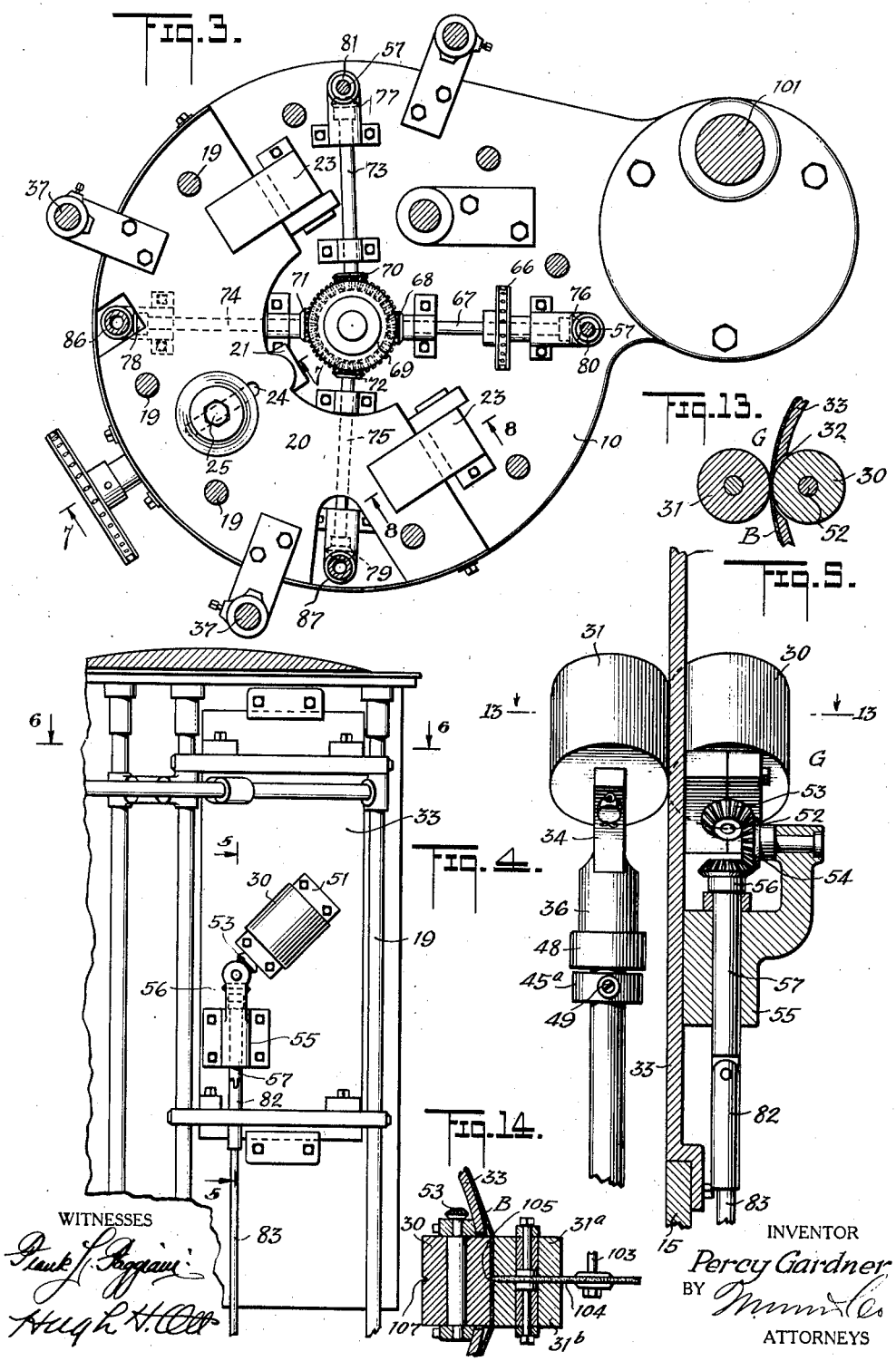

April 13, 1926.
P. GARDNER
BIAS CUTTING MACHINE
Filed Oct. 9, 1924
1,581,051
4 Sheets-Sheet 3
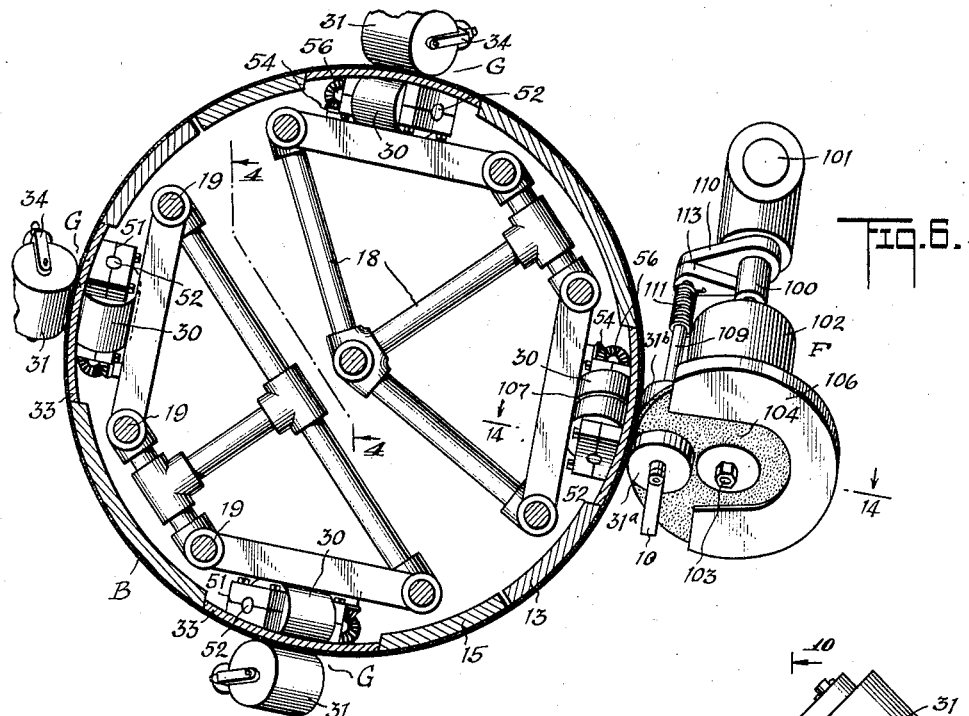
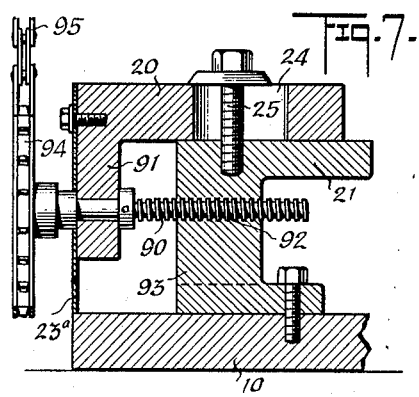
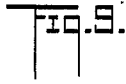
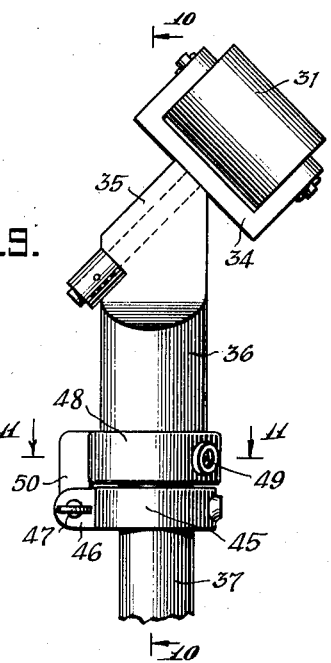
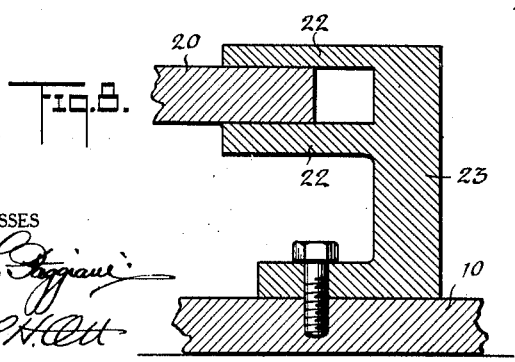
WITNESSES
INVENTOR
Percy Gardner
BY
ATTORNEYS April 13, 1926.

P. GARDNER

BIAS CUTTING MACHINE

Filed Oct. 9, 1924

WITNESSES

INVENTOR
Percy Gardner
BY
ATTORNEYS

Patented Apr. 13, 1926.

1,581,051

UNITED STATES PATENT OFFICE.

PERCY GARDNER, OF EAST ORANGE, NEW JERSEY, ASSIGNOR TO H. M. BUNKER & CO., INC., OF NEW YORK, N. Y., A CORPORATION OF NEW YORK.

BIAS CUTTING MACHINE.

Application filed October 9, 1924. Serial No. 742,658.

*To all whom it may concern:*

Be it known that I, PERCY GARDNER, a citizen of the United States of America, and resident of East Orange, in the county of Essex and State of New Jersey, have invented a new and Improved Bias Cutting Machine, of which the following is a full, clear, and exact description.

This invention has relation to fabric cutting machines and has particular reference to a machine for cutting strips spirally from a tubular fabric or textile material, so that the strip thus produced will be on a bias with respect to the weave of the material.

One of the outstanding objects of the present invention is to provide an improved machine of the character set forth by means of which strips of bias material may be economically and expeditiously cut from a tubular fabric or textile material.

As a further object the invention comprehends a bias cutting machine in which means is afforded for compensating for variation in the diameter of the tubular material.

The invention furthermore comprehends a novel means for supporting a roller or tubular fabric for use in connection with the machine which supporting means facilitates the proper feeding of the fabric by the machine and to the cutting element thereof.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a perspective view of the machine prior to the feeding of the cloth thereon.

Fig. 2 is a similar view with parts of the casing or housing removed.

Fig. 3 is an enlarged horizontal sectional view taken approximately on the line 3—3 of Fig. 2.

Fig. 4 is a fragmentary vertical sectional view taken approximately on the line 4—4 of Fig. 6.

Fig. 5 is a fragmentary vertical sectional view taken approximately on the line 5—5 of Fig. 4.

Fig. 6 is a horizontal sectional view taken approximately on the line 6—6 of Fig. 4.

Fig. 7 is a vertical fragmentary sectional view taken approximately on the line 7—7 of Fig. 3.

Fig. 8 is a fragmentary detail sectional view taken approximately on the line 8—8 of Fig. 3.

Fig. 9 is a fragmentary elevation of one of the pressure rollers.

Fig. 14 is a detail sectional view taken approximately on the line 14—14 of Fig. 6.

Fig. 15 is a detail sectional view taken approximately on the line 15—15 of Fig. 2.

Figure 10:
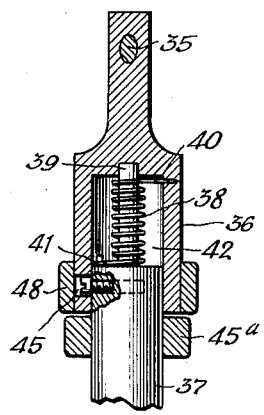
Fig. 10 is a vertical sectional view therethrough taken approximately on the line 10—10 of Fig. 9.

Referring to the drawings by characters of reference, the bias cutting machine constituting the present invention includes broadly a mandrel member or form A which is adapted to have spirally fed thereover the tubular cloth, fabric or material B, which cloth or material is preferably rolled upon a core or shaft C. The core or shaft C is mounted for rotation in the bearings D of a swiveled supporting element E whereby to permit of the unrolling of the fabric and relative turning of the same with respect to the mandrel A during the feeding operation. The machine further includes a cutting mechanism F and a feeding mechanism G, the former comprising a rotary cutting element the cutting edge of which at its point of contact with the material is disposed obliquely at substantially a 45 degree angle to the axis of the mandrel member or form. The feeding mechanism G which is carried by the mandrel member A engages the inner and outer faces of the material at circumferentially spaced points and exerts an angular pull thereon to effect the spiral feeding of the same from the roll over the mandrel and with respect to the cutting mechanism.

The mandrel A includes a base 10, a substantially tubular body 11 and a substantially frusto-conical upper end 12 which facilitates the initial positioning of the end of the tubular fabric B over the mandrel. The body 11 of the mandrel or form A includes an upper stationary semi-cylindrical section 13 and a lower semi-cylindrical stationary but removable section 14 and an upper relatively adjustable semi-cylindrical section 15 and a lower relatively adjustable and removable semi-cylindrical section 16. The removable lower sections 14 and 16 are retained in place by retaining elements or screws 17 which facilitate the removal of said sections to gain access to the mechanism housed thereby. The stationary sections 13 and 14 and the head 12 are supported from the base by a stationary frame-work 18 while the relatively adjustable upper and lower sections 15 and 16 are supported by the vertical rods 19 of a movable framework which is carried by the shelf or bracket 20 mounted for sliding movement over a central guide 21 and between the arms 22 of side guides 23. The shelf or bracket 20 is permanently secured to a non-removable bottom section 23ª forming a part of the adjustable half of the mandrel and said shelf is provided with a central radial slot 24 through which a guide screw 25 passes and is anchored in the central guide 21. Under this arrangement it is therefore obvious that the halves of the body 11 of the mandrel or form A may be relatively moved to increase or decrease the diameter of the mandrel for the accommodation of tubular cloth or material of various diameters.

Figure 12:
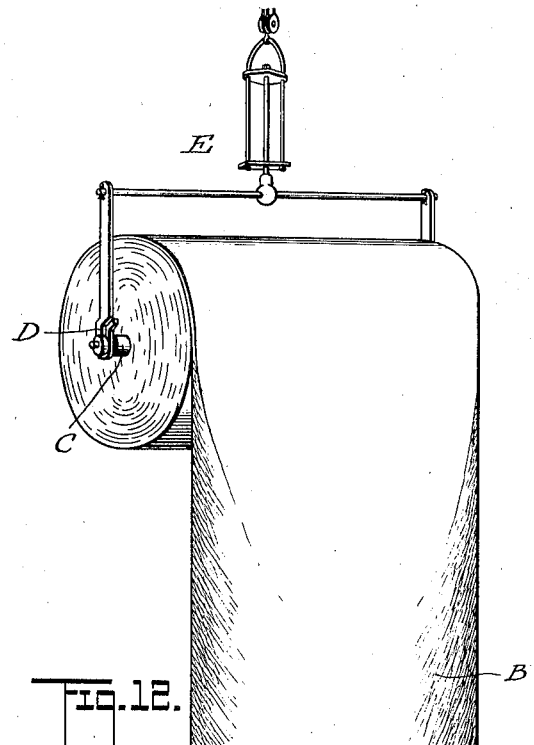
Fig. 12 is a fragmentary perspective view of the machine illustrating the tubular material in feeding relation to the cutting mechanism.
Figure 11:
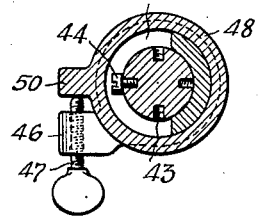
Fig. 11 is a horizontal sectional view therethrough taken approximately on the line 11—11 of Fig. 9.
Figure 13:
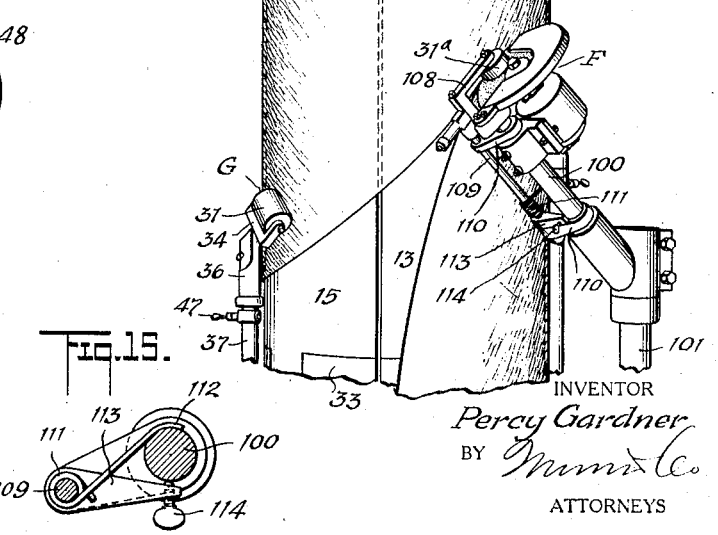
Fig. 13 is a detail fragmentary sectional view taken approximately on the line 13—13 of Fig. 5.

The feeding mechanism G includes a plurality of circumferentially spaced positively driven feed rollers 30 and a corresponding number of coacting pressure rollers 31 to respectively engage the inner and outer faces of the material. These rollers are disposed obliquely at substantially a 45 degree angle to the axis of the mandrel member to exert an angular pull on the cloth or material B to effect the spiral feeding of the same over the mandrel and with respect to the cutting mechanism. As illustrated the positively driven feed rollers 30 are located within the upper sections 13 and 15 of the mandrel body 11 with their peripheries extending slightly through the openings 32 in said section. The sections 15 and 13 as well as the sections 14 and 16 are preferably of wood, fiber or any other suitable material and at the points where the openings 32 are formed said sections are by preference provided with metal inserts 33 which are received in cut-out portions of the sections 15 and 13. The pressure rollers 31 are supported for rotation in bifurcated bearing elements 34 disposed exteriorly of the mandrel which bifurcated bearing elements are provided with stems 35 swiveled in members 36 rotatably mounted on the upper ends of the vertical parallel rods 37. In order to produce a tension force for turning the members 36 to bring the tension rollers into engagement with the cloth or material to obtain proper feeding of the same tension springs 38 are provided, the convolutions of which receive the reduced trunnions 39 projecting axially from the upper ends of the rods 37. One of the ends 40 of each tension spring is anchored to the member 36 while the opposite end 41 is anchored to the upper end of the rod 37. In order to adjust the tension of the springs 38 the upper end of the rod which is received by the axial recess or bore 42 of the member 36 is provided with a plurality of radial threaded openings 43 which selectively receive a screw 44. In line with the openings 43 the member 36 is provided with a semi-annular slot 45 to accommodate the head of the screw 44. A ring 45ª is arranged and secured on each rod 37 immediately below the lower end of the member 36 and said ring is provided with an outwardly projecting lug 46 having a transverse bore through which a set screw 47 extends. A sleeve 48 is carried by each member 36 and is normally held in covering relation to the slot 45 by means of a binding screw 49. The sleeve 48 is provided with a radial depending rib 50 against which the inner end of the set screw 47 is impinged. By adjusting the set screws 47 it will be observed that the members 36 may be turned relative to the rods 37 and against the tension of the springs 38 to swing the pressure rollers 31 to a sufficiently spaced relation with respect to the mandrel whereby to permit of the positioning of the cloth or fabric on the mandrel or the removal of the same therefrom. The feed rollers 30 which are mounted in split bearings 51 carried by the inner faces of the insert plates 33 are secured to stub shafts 52 and at one end each stub shaft is provided with a bevel pinion 53 which meshes with an idler pinion 54 carried by a bearing bracket 55. A bevel pinion 56 meshes with each idler pinion 54 and is carried by the upper end of a vertical shaft 57 which extends through the bearing bracket 55. The means for driving the feeding mechanism i. e., for positively driving the feed rollers 30 consists of a motor 58 which is mounted upon a supporting shelf 59 carried by the base 10. The motor shaft 59ª has keyed thereon a pulley 60 which is operatively connected with a superposed pulley 61 by means of a belt 62. The pulley 61 is in turn operatively connected through a train of reducing gears 63 to a sprocket 64 which sprocket is in turn operatively connected by a sprocket chain 65 with a driven sprocket 66. The driven sprocket 66 is keyed to a radial shaft 67 mounted on the base 10. The inner end of the shaft 67 is provided with a bevel gear 68 which meshes with and drives a crown gear 69. The crown gear 69 in turn meshes with a plurality of circumferentially spaced bevel pinions 70, 71 and 72 which are keyed respectively to the inner ends of the radially disposed shafts 73, 74 and 75 which shafts are mounted in suitable bearings on the base 10. The outer ends of the shafts 67, 73, 74 and 75 have keyed thereto bevel pinions 76, 77, 78 and 79. Bevel gears 80 and 81 mesh with the pinions 76 and 77 and are keyed to the lower ends of the vertical shafts 57. In order to compensate for the relative movement of the movable half of the mandrel while at the same time to effect the driving of the feed rollers 30 the vertical shafts 57 which are carried by said movable half are considerably shorter than the shafts 57 carried by the stationary half of the mandrel and said shafts have connected therewith by a universal joint 82 a shaft section 83 which is telescopically received in a second shaft section 84 which second shaft section 84 is connected by a universal joint 85 to the shafts of the bevel pinions 86 and 87 which mesh with the bevel pinions 78 and 79. The telescopic shaft sections 83 and 84 are splined to each other in order that the same will rotate together while permitting of telescopic movement. From the foregoing it will thus be seen that the feeding rollers 30 are simultaneously driven from the motor 58 to rotate in the same direction whereby they will exert a spiral feeding of the cloth or material B over the mandrel A as indicated by the arrow in Fig. 12, due to the pressure of the cloth against the feeding rollers by the pressure rollers 31.

In order to effect the relative adjustment of the movable half of the mandrel with respect to the stationary half to increase or decrease the diameter of the mandrel to compensate for variations in the diameter of the tubular cloth or material a jack screw 90 is mounted for rotation in the depending portion 91 of the shelf or bracket 20, said jack screw extending radially inward and threadedly engaging the threaded bore 92 in the vertical portion 93 of the central guide 21 which guide is rigidly attached to the base 10. The jack screw projects through the non-removable but adjustable portion 23ª of the movable half of the mandrel and has keyed to its outer end a sprocket 94 operatively connected by a sprocket chain 95 with a sprocket 96 mounted on one of the rods 37. A manipulating hand wheel 97 is attached to the sprocket.

The cutting mechanism F is carried by the angularly disposed arm 100 at the upper end of a standard 101 which is supported from the base 10 and which standard is arranged along side of the mandrel. The arm 100 has mounted thereon a motor 102 to the shaft 103 of which is secured a disk cutting knife 104 preferably constructed of emery. The cutting edge 105 of the knife is disposed at its point of contact with the material, at substantially a 45 degree angle to the axis of the mandrel and at an angle coincident with the angularity of the rollers of the feeding mechanism but in a plane slightly above three of the sets of rollers, the remaining set being in the same plane with the cutting knife. The cutting knife is preferably covered for its major part with a guard 106 leaving only that portion exposed which is adapted for contact with the material. The feeding roller 30 which is in the same plane with the cutting knife is provided with a central annular groove 107 while the pressure roller which cooperates with said feeding roller is divided transversely into sections 31ª and 31ᵇ disposed at opposite sides of the cutting knife. In this instance the divided pressure roller sections 31ª and 31ᵇ are rotatably mounted on each furcation of the bifurcated bearing member 108 which bearing member is carried by a tensioned shaft 109. The shaft 109 is mounted in bearings 110 on the angular arm 100. The means for tensioning the shaft to swing the bifurcated bearing 108 of the roller sections 31ª and 31ᵇ into impinging contact with the cloth or material consists of a tension spring 111 one terminal 112 of which engages the arm 100 and the opposite terminal of which engages a radial arm 113 secured to the shaft 109. In order to swing the roller sections 31ª and 31ᵇ to a position out of contact with the cloth or material B and to further function as a means for adjusting the tension a set screw 114 is threaded through the free terminal of the radial arm 113 and engages with the angular arm 100 of the standard.

In use and operation of the machine the tubular cloth or material B is fed spirally over the mandrel A by the feeding mechanism G so that the cutting edge 105 of the knife 104 effects a continuous spiral cut in the tubular material to produce therefrom a strip of material in which the warp and woof threads or in other words the weave of the fabric is on the bias. It is of course to be understood that the fabric due to the feeding mechanism is simultaneously fed onto the mandrel and turned relative thereto to effect the spiral feeding and spiral cutting of the same for the purpose specified. When it is desired to increase or decrease the diameter of the mandrel or form A, the movable half is moved relatively to the stationary half by manipulation of the hand wheel 97. Adjustment of the tension of the pressure rollers may be accomplished by loosening the binding screws 49 in the sleeves 48, sliding the sleeves upwardly to expose the slots 45 and removing and reinserting the screws 44 in one of the threaded openings 43 in the upper ends of the rods 37, and then replacing the sleeve and tightening the binding screw thereof. The pressure rollers are as illustrated mounted in such a manner that they have substantially a universal movement to insure their proper engagement with the cloth or material. When access is to be gained to the mechanism which is housed by the mandrel, the retaining elements 17 are removed to admit of the removal of the lower stationary and removable sections 14 and 16.

From the foregoing it will thus be seen that a comparatively simple yet highly efficient machine has been devised for cutting a bias strip from a tubular material.

I claim:

1. A bias cutting machine comprising a radially contractible and expansible mandrel member over which a tubular material is fed, means carried by the mandrel member engaging said material for feeding the same spirally thereover and a cutting element for cutting a spiral strip from said material.

2. A bias cutting machine comprising a radially contractible and expansible mandrel member over which a tubular material is fed, means carried by the mandrel member engaging said material for feeding the same spirally thereover and a cutting element for cutting a spiral strip from said material, said cutting element being disposed obliquely and coincident with the oblique feeding of the material over the mandrel.

3. A bias cutting machine comprising a radially contractible and expansible mandrel member over which a tubular material is fed, means carried by the mandrel member engaging said material for feeding the same spirally thereover and a cutting element for cutting a spiral strip from said material, said cutting element being disposed obliquely and coincident with the oblique feeding of the material over the mandrel and means for effecting radial expansion and contraction of said mandrel to compensate for tubular materials of different diameters.

4. A bias cutting machine including a cylindrical mandrel member over which a tubular material is fed, means for feeding said material in a spiral path over said mandrel member, a cutting element for cutting a strip spirally from said material during the feeding of the same over the mandrel member, and loosely swiveled means for supporting a roll of said tubular material to permit of a free feeding of the material to the mandrel member.

5. A bias cutting machine comprising a circular member over which a tubular material is fed, means engaging said material for feeding the same in a spiral path over said member and a cutting element for cutting a strip spirally from said material and means for supporting a roll of said tubular material to permit of said material feeding means effecting the unrolling and bodily turning movement of the roller whereby to permit of the spiral feeding of the material in accordance with the speed of the feeding means on the mandrel, said roll supporting means comprising a roller core, a bearing member in which the roller core is rotatably mounted and a free swivel connection between the bearing member and an overhead support.

6. In a machine for cutting a strip spirally from a tubular fabric whereby to produce a fabric strip on the bias to the weave of the same, a mandrel over which one end of the fabric is initially positioned, means associated with the mandrel for engaging the inner and outer surfaces of the tubular fabric to feed the same longitudinally and rotatably over the mandrel and a cutting means tangentially engaging the fabric and disposed at an angle with respect thereto for severing the same on a spiral line during the feeding operation, the said mandrel including radially adjustable sections extending longitudinally thereof for compensating for variations in the diameter of the fabric.

7. In a machine for cutting a strip spirally from a tubular fabric whereby to produce a fabric strip on the bias to the weave of the same, a mandrel over which one end of the fabric is initially positioned, means associated with the mandrel for engaging the inner and outer surfaces of the tubular fabric to feed the same longitudinally and rotatably over the mandrel and a cutting means tangentially engaging the fabric and disposed at an angle with respect thereto for severing the same on a spiral line during the feeding operation, the said feeding means including a plurality of circumferentially spaced sets of inner positively driven feed rollers and outer tensioned pressure rollers, the mandrel having openings therein through which the peripheries of the feed rollers slightly protrude.

8. In a machine for cutting a strip spirally from a tubular fabric whereby to produce a fabric strip on the bias to the weave of the same, a mandrel over which one end of the fabric is initially positioned, inner driven and outer idler pressure rollers associated with the mandrel for engaging the inner and outer surfaces of the tubular fabric to feed the same longitudinally and rotatably over the mandrel and a cutting means tangentially engaging the fabric and disposed at an angle with respect thereto for severing the same on a spiral line during the feeding operation and means for adjusting the tension of the pressure rollers.

9. A bias cutting machine including a mandrel member over which a tubular material is fed, means carried by the mandrel member engaging said material for feeding the same spirally thereover, a cutting element for cutting a spiral strip from said material during the feeding operation and means for supporting a roll of said tubular material for free bodily turning and unrolling movement coincident with the feeding means on the mandrel.

10. A bias cutting machine for tubular materials comprising a vertically disposed mandrel over which a tubular material is adapted to be fed, means carried by the mandrel engaging said material for feeding the same spirally thereover, a cutting element for cutting a spiral strip from said material and superimposed means for supporting a roll of said tubular fabric for free bodily turning and unrolling movements by and coincident with the feeding means whereby the cutting and feeding are synchronized.

11. A bias cutting machine for tubular materials, comprising a vertically disposed mandrel over which the tubular material is adapted to be fed, means for spirally feeding the same from an overhead supply over the mandrel, and a cutting element for cutting a spiral strip from said material.

PERCY GARDNER.